(12) United States Patent
Puzder

(10) Patent No.: US 10,878,523 B2
(45) Date of Patent: Dec. 29, 2020

(54) LEGAL MATTER PROGRESS MANAGEMENT SYSTEMS AND METHODS

(71) Applicant: Legal Facts, LLC, San Clemente, CA (US)

(72) Inventor: Andrew Christian Puzder, Mesa, AZ (US)

(73) Assignee: Legal Facts, LLC, San Clemente, CA (US)

( * ) Notice: Subject to any disclaimer, the term of this patent is extended or adjusted under 35 U.S.C. 154(b) by 56 days.

(21) Appl. No.: 16/419,391

(22) Filed: May 22, 2019

(65) Prior Publication Data
US 2020/0372592 A1 Nov. 26, 2020

(51) Int. Cl.
| | |
|---|---|
| G06F 3/0482 | (2013.01) |
| G06F 3/0484 | (2013.01) |
| G06Q 50/18 | (2012.01) |
| G06Q 30/00 | (2012.01) |

(52) U.S. Cl.
CPC ........... G06Q 50/18 (2013.01); G06F 3/0482 (2013.01); G06F 3/0484 (2013.01); G06Q 30/018 (2013.01)

(58) Field of Classification Search
CPC ......... G06F 16/24539; G06F 16/24575; G06F 16/254; G06F 21/6218
See application file for complete search history.

(56) References Cited

U.S. PATENT DOCUMENTS

| | | | |
|---|---|---|---|
| 2002/0107886 A1* | 8/2002 | Gentner | G06F 40/166 715/255 |
| 2014/0033088 A1* | 1/2014 | Shaver | G06F 40/197 715/764 |
| 2018/0300304 A1* | 10/2018 | Mullins | G06Q 10/101 |
| 2019/0095991 A1* | 3/2019 | Swaminathan | G06Q 50/167 |

* cited by examiner

*Primary Examiner* — Rayeez R Chowdhury
(74) *Attorney, Agent, or Firm* — Seed Intellectual Property Law Group LLP

(57) ABSTRACT

A system and method of employing a computing device to present a graphical user interface (GUI) with a legal matter status bar. A status bar is generated to include a representation of each phase of a legal matter, the phases represent a chronological order of event groupings throughout the legal matter. The status bar and the representation of each phase are displayed in the GUI. Marker-eligible phases are determined based on each of the marker-eligible phases having a previously established event. A marked phase from the marker-eligible phases is selected based on the marked phase having a most recently added event. The display of the status bar is modified to associate a marker with the representation of the marked phase. When a new event for a phase is received, the display of the status bar is modified to associate the marker with the representation of that phase.

24 Claims, 15 Drawing Sheets

Edit Event

File Name: INVESTORS WARRANTY v. ACB TITLE CO.
Event Type: ○ Hearing on Motion
Event Category: Hearings Status:
* Hearing Date: 2017-07-02
Start Time: 1:30 PM
End Time:
Set by:
* Venue: ○ Orange Court House
Judge: ○ Hon. Mary Smith
Issues:
Summary: As shown below and by the accompanying declarations of John Q. Smith, plaintiffs have failed to comply with and have violated their ethical duties in refusing to return, and

* Signing Attorney:

Show Dependencies

Cancel

Edit Calendar Reminder

* Title: Hearing on Motion to Disqualify
* Start Date: 2017-07-02
Start Time: 1:30 PM Create Alert Reminder 3  Days Extra Notes:

Location:
End Date: yyyy-mm-dd
End Time:

Before Start Time

Add Users Manually:

Assign  User

Delete for everyone

Close

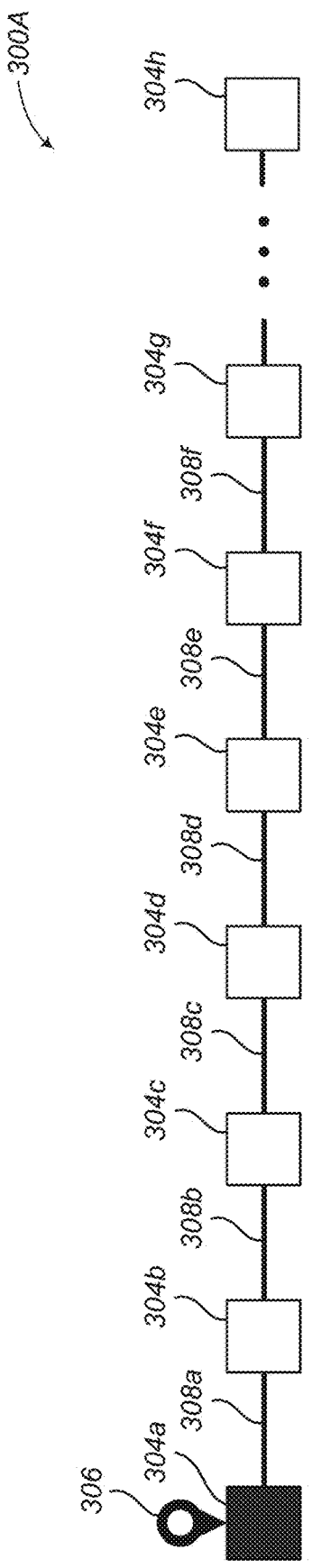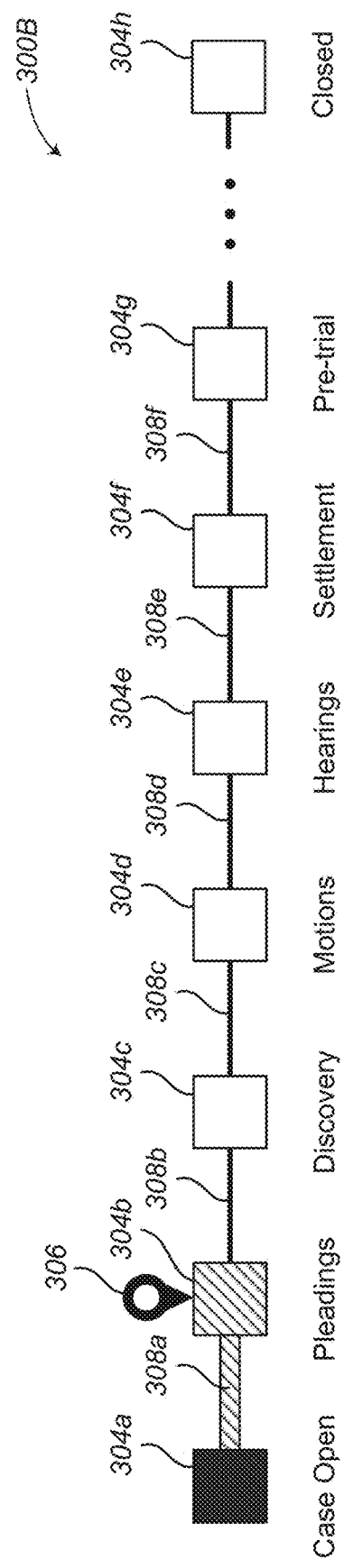
Fig. 3A
Fig. 3B

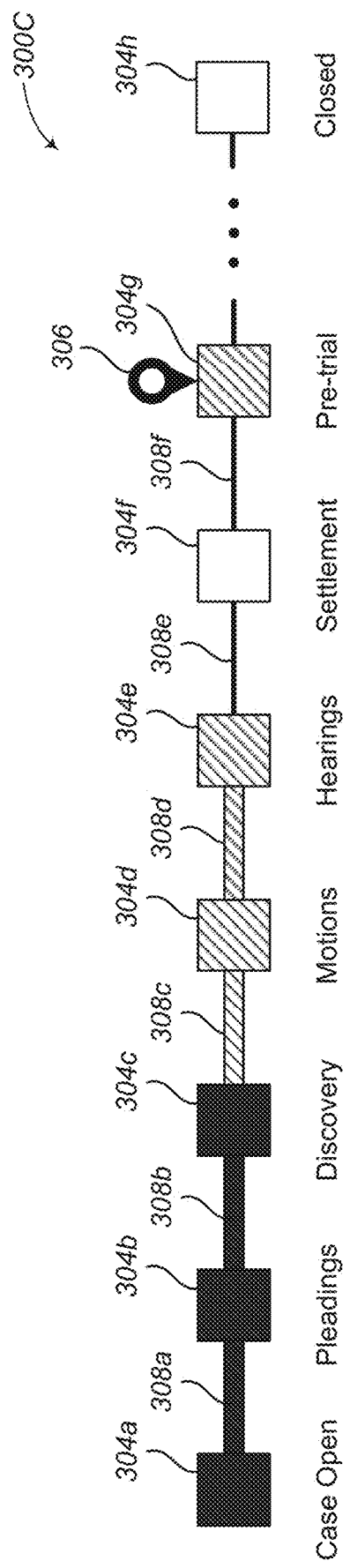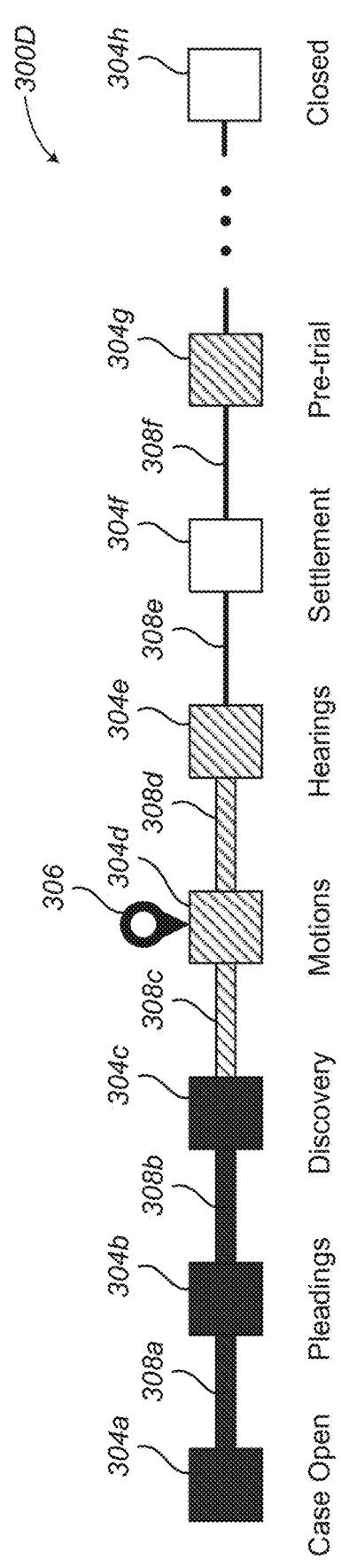
Fig. 3C
Fig. 3D

LEGAL MATTER PROGRESS MANAGEMENT SYSTEMS AND METHODS

TECHNICAL FIELD

The present disclosure is related generally to providing a graphical user interface, and particularly to presenting an interactive legal matter status bar in the graphical user interface.

BACKGROUND

Description of the Related Art

Legal proceedings can be very complex with many different parts involving many different parties. These parties not only include the legal parties to the legal proceeding, such as a lawsuit, but also their attorneys, experts, support staff, and other interested persons. Each of these parties may have different tasks to perform or to monitor at different times throughout the legal proceeding. Keeping track of which tasks have been performed, as well as scheduling future tasks, can be very difficult and time consuming, especially as the complexity of the proceeding and the number of parties increases. Therefore, it is often not an easy task for a party to look at a legal proceeding and determine what has taken place and what is the next step. It is with respect to these and other considerations that the embodiments described herein have been made.

BRIEF SUMMARY

Briefly described, embodiments are directed towards a graphical user interface that displays a status bar for a legal matter, where the status bar includes a representation of each phase of the legal matter and a marker indicating which phase included a most recent event.

A method may be summarized as including generating a status bar to include a representation of each of a plurality of phases of a legal matter, the plurality of phases represent a chronological order of event groupings throughout the legal matter; displaying the status bar and the representation of each of the plurality of phases in a graphical user interface, determining one or more marker-eligible phases from the plurality of phases based on each of the one or more marker-eligible phases having at least one previously established event; selecting a marked phase from the one or more marker-eligible phases based on the marked phase having a most recently added event among the one or more marker-eligible phases; and modifying the display of the status bar in the graphical user interface to associate a marker with the representation of the marked phase. The plurality of phases may include at least three of: matter open, pleadings, discovery, motions, hearings, settlement, pre-trial, trial, collections, and matter close. The plurality of phases may include at least three of: disclosure, drafting, inventor review, document execution, filing, office action, response, allowance, and grant.

The method may further include receiving a new event for the legal matter having a date, title, and corresponding phase of the plurality of phases; and modifying the display of the status bar in the graphical user interface to associate the marker with the representation of the corresponding phase for the new event.

The method may further include receiving, via a user interaction with the representation of a target phase of the plurality of phases on the status bar in the graphical user interface, a selection of the target phase; identifying each event associated with the target phase; and displaying at least a portion of the identified events in chronological order in the graphical user interface.

The method may further include receiving an indication that a target phase of the plurality of phases is complete; and in response to receipt of the indication that the target phase is complete, modifying a display characteristic of the representation of the target phase on the status bar to indicate that the target phase is complete. Modifying the display characteristic of the representation of the target phase may include at least one of: changing color of the representation of the target phase; changing a size of the representation of the target phase; changing a shape of the representation of the target phase; and changing a font of a label associated with the representation of the target phase. Receiving the indication that the target phase is complete may include receiving, via a user interaction with an event of the target phase in the graphical user interface, a selection that the event is complete.

The method may further include receiving a new event for the legal matter having a corresponding phase of the plurality of phases; determining that the new event is a first event for the corresponding phase; and modifying a display characteristic of the representation of the corresponding phase on the status bar to indicate that the corresponding phase has started. Modifying the display characteristic of the representation of the corresponding phase may include at least one of: changing color of the representation of the corresponding phase; changing a size of the representation of the corresponding phase; changing a shape of the representation of the corresponding phase; and changing a font of a label associated with the representation of the corresponding phase.

A non-transitory computer-readable storage medium having stored thereon instructions that, when executed by a processor, may cause the processor to perform actions, may be summarized as including generating a status bar to include a representation of each of plurality of phases of a legal matter, the plurality of phases represent a chronological order of event groupings throughout the legal matter; displaying the status bar and the representation of each of the plurality of phases in a graphical user interface, determining one or more marker-eligible phases from the plurality of phases based on each of the one or more marker-eligible phases having at least one previously established event; selecting a marked phase from the one or more marker-eligible phases based on the marked phase having a most recently added event among the one or more marker-eligible phases; and modifying the display of the status bar in the graphical user interface to associate a marker with the representation of the marked phase.

Execution of the instructions by the processor may cause the processor to perform further actions, the further actions including receiving a new event for the legal matter having a date, title, and corresponding phase of the plurality of phases; and modifying the display of the status bar in the graphical user interface to associate the marker with the representation of the corresponding phase for the new event.

Execution of the instructions by the processor may cause the processor to perform further actions, the further actions including receiving, via a user interaction with the representation of a target phase of the plurality of phases on the status bar in the graphical user interface, a selection of the target phase; identifying each event associated with the target phase; and displaying at least a portion of the identified events in the graphical user interface.

Execution of the instructions by the processor may cause the processor to perform further actions, the further actions including receiving an indication that a target phase of the plurality of phases is complete; and in response to receipt of the indication that the target phase is complete, modifying a display characteristic of the representation of the target phase on the status bar to indicate that the target phase is complete.

Execution of the instructions by the processor may cause the processor to perform further actions, the further actions including receiving a new event for the legal matter having a corresponding phase of the plurality of phases; determining that the new event is a first event for the corresponding phase; and modifying a display characteristic of the representation of the corresponding phase on the status bar to indicate that the corresponding phase has started.

A computing device may be summarized as including a non-transitory memory that stores computer instructions; and a processor that executes the computer instructions to: generate a status bar to include a representation of each of plurality of phases of a legal matter, the plurality of phases represent a chronological order of event groupings throughout the legal matter; display the status bar and the representation of each of the plurality of phases in a graphical user interface, determine one or more marker-eligible phases from the plurality of phases based on each of the one or more marker-eligible phases having at least one previously established event; select a marked phase from the one or more marker-eligible phases based on the marked phase having a most recently added event among the one or more marker-eligible phases; and modify the display of the status bar in the graphical user interface to associate a marker with the representation of the marked phase.

The processor may further execute the computer instructions to: receive a new event for the legal matter having a date, title, and corresponding phase of the plurality of phases; and modify the display of the status bar in the graphical user interface to associate the marker with the representation of the corresponding phase for the new event.

The processor may further execute the computer instructions to: receive, via a user interaction with the representation of a target phase of the plurality of phases on the status bar in the graphical user interface, a selection of the target phase; identify each event associated with the target phase; and display at least a portion of the identified events in the graphical user interface.

The processor may further execute the computer instructions to: receive an indication that a target phase of the plurality of phases is complete; and in response to receipt of the indication that the target phase is complete, modify a display characteristic of the representation of the target phase on the status bar to indicate that the target phase is complete.

The processor may further execute the computer instructions to: receive a new event for the legal matter having a corresponding phase of the plurality of phases; determine that the new event is a first event for the corresponding phase; and modify a display characteristic of the representation of the corresponding phase on the status bar to indicate that the corresponding phase has started.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIGS. 2A-2F illustrate use case example screenshots of a graphical user interface in accordance with embodiments described herein.

FIGS. 3A-3F illustrate an enlarged, simplified example of a legal matter status bar in accordance with embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including, but not limited to, the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references.

Figure 1:
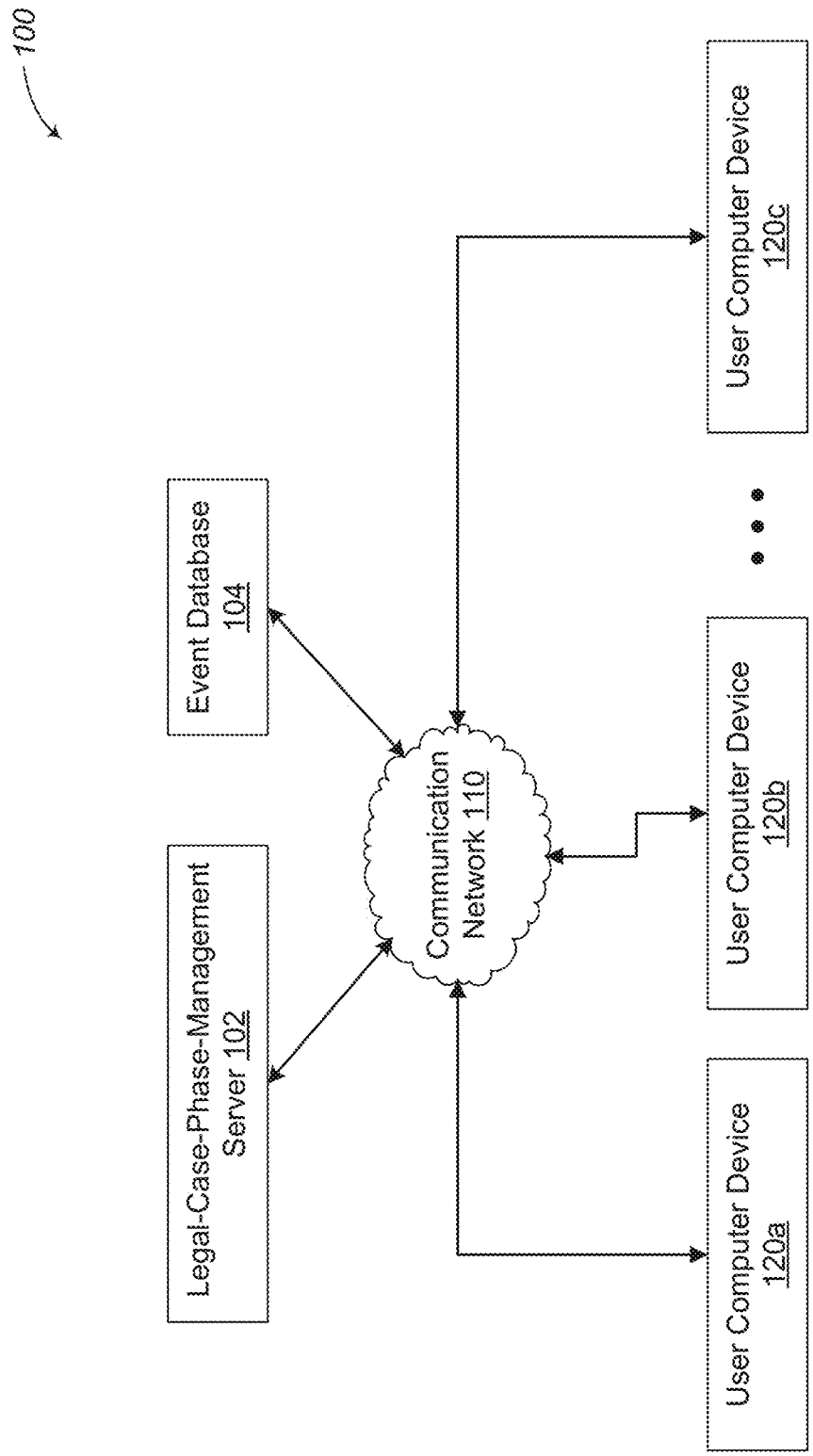
FIG. 1 is a context diagram of an environment for providing a legal matter status bar in a graphical user interface to users in accordance with embodiments described herein.

FIG. 1 is a context diagram of an environment 100 for providing a legal matter status bar in a graphical user interface to users in accordance with embodiments described herein. Environment 100 includes a legal-matter-phase-management server 102 in communication with an event database 104 and a plurality of user computer devices 120a-120c (collectively 120) via a communication network 110. Examples of the user computer devices 120a-120c include smart phones, tablet computers, laptop computers, desktop computers, or other computing devices.

The legal-matter-phase-management server 102 is a computer device, such as a server computer or cloud-computing resources, that generates and presents a graphical user interface to a user computer device 120. As described herein, the graphical user interface includes a status bar for a legal matter. This status bar is also referred to herein as a legal matter status bar. The legal matter may be a litigation, case, arbitration proceeding, appeal process, patent drafting or prosecution process, contract negotiation, or other legal proceeding that has multiple phases. As described in more detail below, the status bar includes a representation of each of a plurality of phases of the legal matter. Each phase representation includes one or more characteristics that can be changed depending on the status of that phase. For example, a completed phase may be colored green and a phase that has not started may be colored black.

The graphical user interface also includes a marker on or adjacent to the status bar to indicate a current phase in the legal matter. As described below, the marker is associated with a phase that includes a most recently added event. Events are tasks or information about a particular phase in the legal matter. Examples of events may include, but are not limited to, a reminder of a deposition, an indication that a draft was sent to the client, an entry of a document that was received from outside counsel, etc. Events are the input of what is happening with the legal matter. The legal-matter-phase-management server 102 stores the events in event database 104. In some embodiments, the event database 104 may be a standalone or separate computing device from the legal-matter-phase-management server 102. In other embodiments, the event database 104 is stored in the memory of the legal-matter-phase-management server 102.

The legal-matter-phase-management server 102 presents the graphical user interface to users of the user computer devices 120a-120c. In some embodiments, the user computer devices 120a-120c access the graphical user interface via an interactive website or web portal hosted or created by the legal-matter-phase-management server 102. In other embodiments, the user computer devices 120a-120c may have stored thereon an application or program that renders the graphical user interface to the users of the user computer devices 120a-120c. In such an embodiment, the legal-matter-phase-management server 102 generates the information (e.g., what phases to represent on the status bar, where to position the marker, etc.) to render the graphical user interface. In yet other embodiments, the functionality of the legal-matter-phase-management server 102 is provided by the user computer devices 120 themselves, such as via an application or program installed on the user computer devices 120.

The user computer devices 120 also receive user interactions with the graphical user interface and provide them to the legal-matter-phase-management server 102 via communication network 110. The user interactions may include, but are not limited to, entry of new events, selection of a phase representation on the status bar, updates to events, etc.

The communication network 110 may be configured to couple various computing devices to transmit content/data from one or more computing devices to one or more other computing devices. For example, communication network 110 may be the Internet, X.25 networks, or a series of smaller or private connected networks that carry the content and other data. Communication network 110 may include one or more wired or wireless networks.

FIGS. 2A-2F illustrate use case example screenshots of a graphical user interface in accordance with embodiments described herein. Interfaces 200A-200F in FIGS. 2A-2F, respectively, may be a collection of graphical user interfaces that are generated and presented to a user, and may be collectively referred to as a graphical user interface.

Figure 2A:
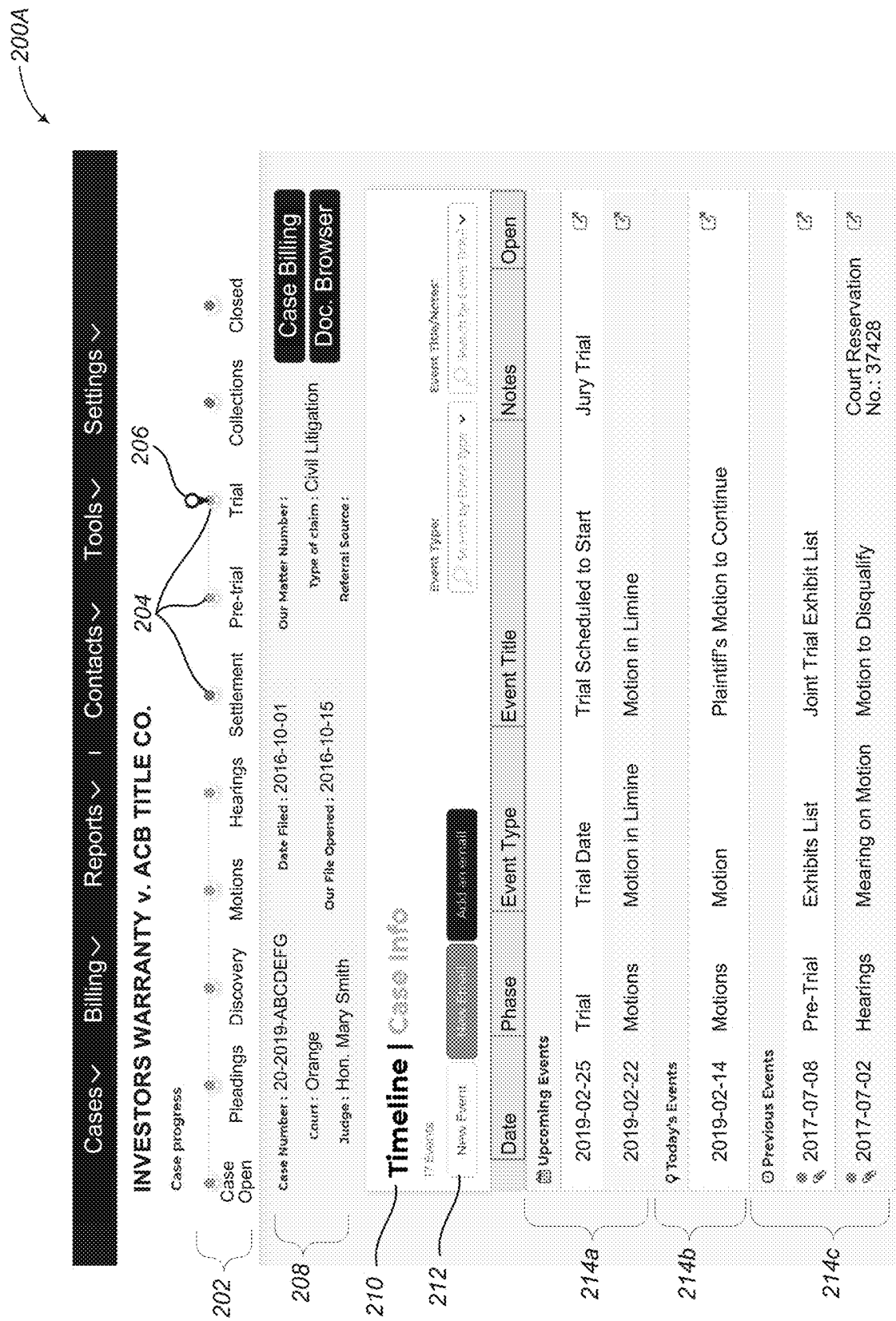

Interface 200A in FIG. 2A is a graphic user interface of a legal matter status bar 202 with which the user can interact. An enlarged, simplified example of the status bar 202 is illustrated in FIGS. 3A-3F. Briefly, however, the status bar 202 includes a plurality of phase representations 204. Each phase representation 204 is associated with a phase of the legal matter. In this illustrated example, the phases include: matter open, pleadings, discovery, motions, hearings, settlement, pre-trial, trial, collections, and closed. Other numbers and types phases may also be employed. In various embodiments, the phases represented on the status bar 202 are set by a developer or administrator and cannot be changed by a user. In other embodiments, the user may define, or select from pre-defined phases, the phases are to be represented on the status bar 202. In yet other embodiments, the user may be enabled to split a pre-defined phase into multiple representations or combine multiple representations into a single representation. For example, the user may combine a pre-trial phase representation with a trial phase representation.

A marker 206 is included in the status bar 202 and is associated with a current phase of the phase representations 204. In various embodiments, the current phase may be the phase with a most recently added event. The marker 206 moves from one phase representation 204 to another as the legal matter progresses based on the addition and status of the events.

The interface 200A also includes matter information 208. The matter information 208 may include, but is not limited to: matter number, date filed or started, client or attorney matter number, court or jurisdiction for the matter, judge or reviewer or overseer, type of matter, etc.

The interface 200A is also displaying a timeline 210. The timeline 210 lists a plurality of events 214a-214c (collectively 214) already entered by the user. The events 214 may be listed in chronological order. In some embodiments, the events 214 may be grouped into upcoming events 214a, today's events 214b, and previous events 214c, as illustrated. Each event 214 includes a due date, phase, event type, and event title. The events 214 may also include milestones, notes, attachments, or other information.

Figure 2B:
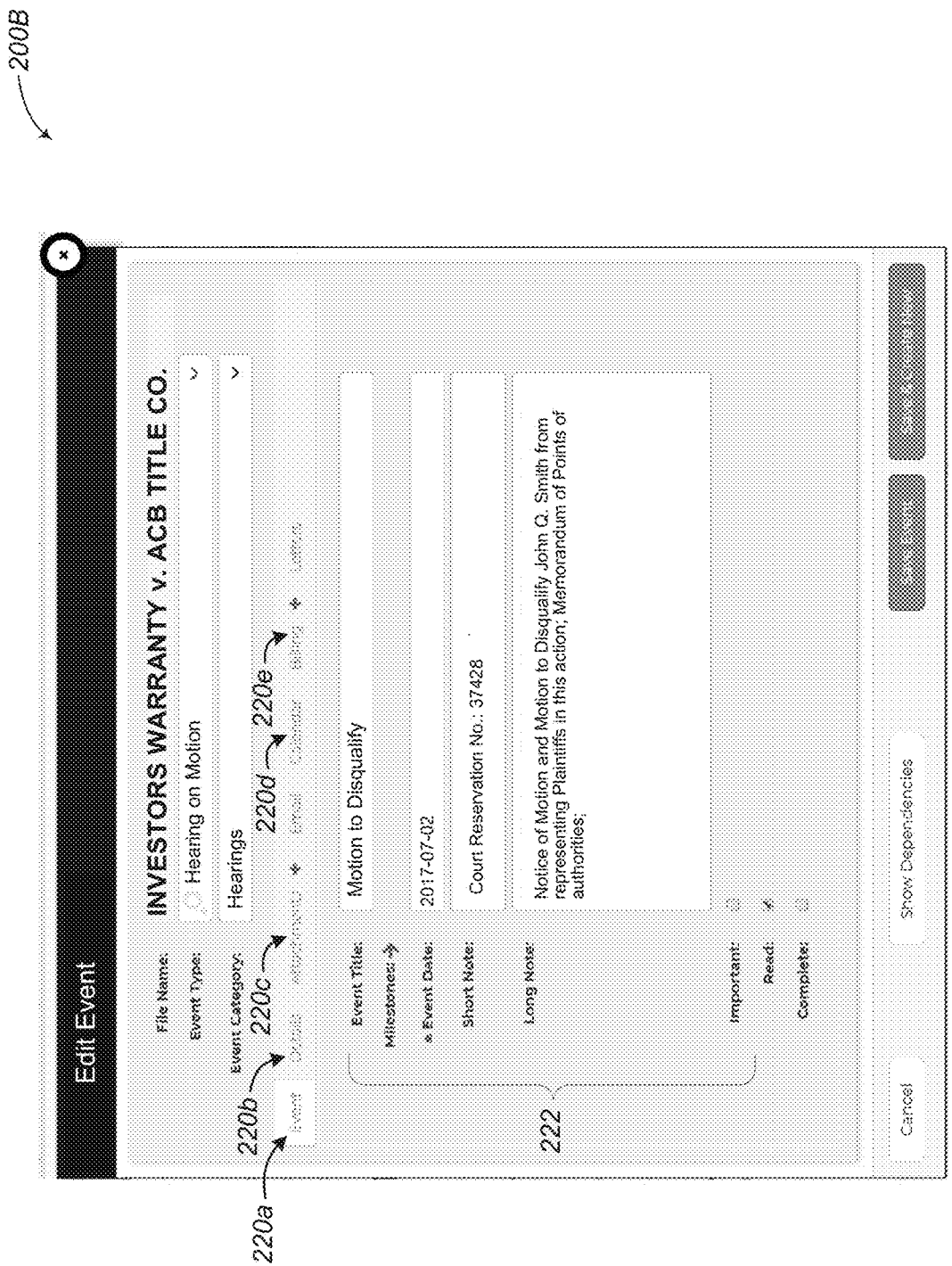

A user can create a new event 214 by clicking on the new event button 212, which may navigate to another screen or open another window, such as interface 200B in FIG. 2B. In other embodiments, the user can create a new event 214 by clicking on a particular phase representation 204. By clicking on a particular phase representation 204, the system may navigate to another screen or open another window, such as interface 200B in FIG. 2B, where at least some of the information is pre-selected based on the particular phase representation 204. For example, if the user clicks on the phase representation 204 for "Hearings" then "Hearings" may be preselected, preassigned, or prepopulated as the phase name or phase category for the new event.

Interface 200B in FIG. 2B is a graphic user interface in which a user can add or modify information associated with an event. The interface 200B includes multiple input boxes 222, where the user can enter information about the event. In various embodiments, the information requested in input boxes 222 may be subjective or tailored for the particular event being added or modified, which may be identified based on the phase associated with the event. Examples of the information that may be included in the input boxes 222 may include, but are not limited to, an event type, event phase, event title, event date, notes, etc. The event type identifies the nature of the event. The event phase identifies the phase in the legal matter with which the event is associated. In some embodiments, the event phase may also be referred to as the event category. The event date is the date in which a task is to occur or be completed, or the date on which the task has occurred or was completed. For example, if the event is a hearing, then the event date is the date of the hearing. Alternatively, if the event is draft opinion, then the event date is the target or due date of the opinion. The notes may include short or long notes that can be customized by and meaningful to the user.

The interface 200B also includes multiple input buttons 220a-220e (collectively 220). When a user clicks on an input button 220, additional screens or windows open to allow the user to enter additional information for the event. For example, input button 220a enables the user to enter the data in the input boxes 222; input button 220b opens interface 200C in FIG. 2C for the user to enter additional event details; input button 220c opens interface 200D in FIG. 2D for the user to add documents or attachments to the event; input button 220d opens interface 200E in FIG. 2E for the user to enter calendar reminder information for the event; and input button 220e opens interface 200F in FIG. 2F for the user to enter billing information for the event.

Interface 200C in FIG. 2C enables the user to enter additional event details via input boxes 224. In this illustrated example, input boxes 224 enable the user to enter a status of the event (e.g., in progress, complete, drafting, in review, etc.), a date for the event, start and end time for the event, which user set the event, where the event is to be conducted, a judge or reviewer or overseer of the event, issues to present at the event, a summary of the event or arguments to be made, etc.

In some embodiments, the input boxes 224 may be customized for the particular event type or event phase. For example, if the event phase is hearings, then the input boxes 224 may require the user to enter a hearing date. But if the event phase is settlement, then the input boxes 224 may include a text box for the user to enter a settlement offer amount. Moreover, some of the details provided in the input boxes 224 may have been pre-populated based on details provided in interfaces 220B in FIG. 2B or 200E in FIG. 2E.

Figure 2D:
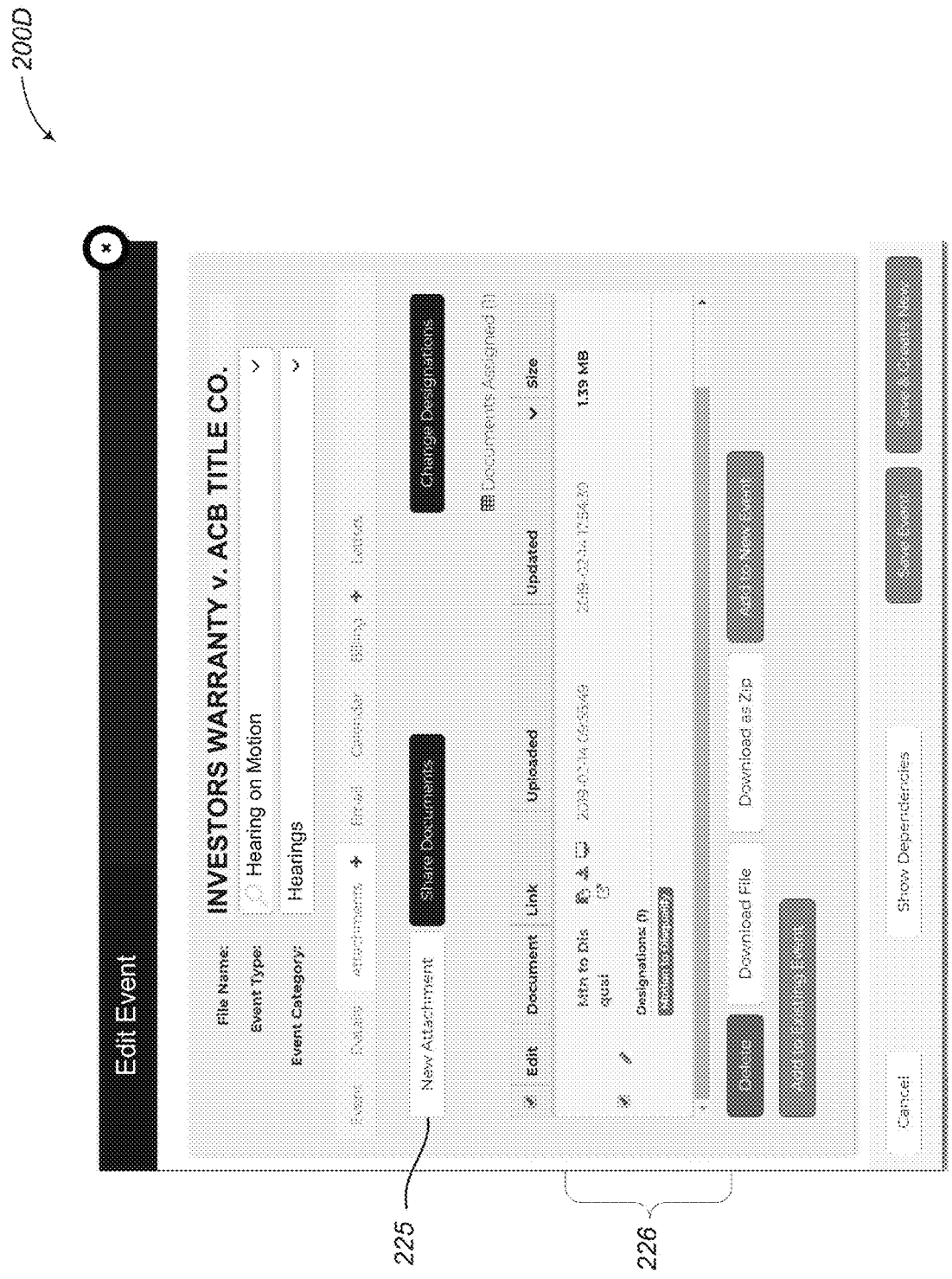

Interface 200D in FIG. 2D enables the user to add documents or attachments to the event. For example, user can click button 225, which may open a window that enables the user to select one or more files or documents to attach to the event. A brief summary 226 of the attached documents is also provided to the user.

Interface 200E in FIG. 2E enables the user to enter calendar reminder information via input boxes 228. For example, the user can enter the title of the event, a start and end time for the event, a location of the event, a date of the event, a calendar reminder, additional notes, select which users or people are to participate, etc. Some of the details provided in the input boxes 228 may have been pre-populated based on details provided in interfaces 220B in FIG. 2B or 200C in FIG. 2C.

Figure 2F:
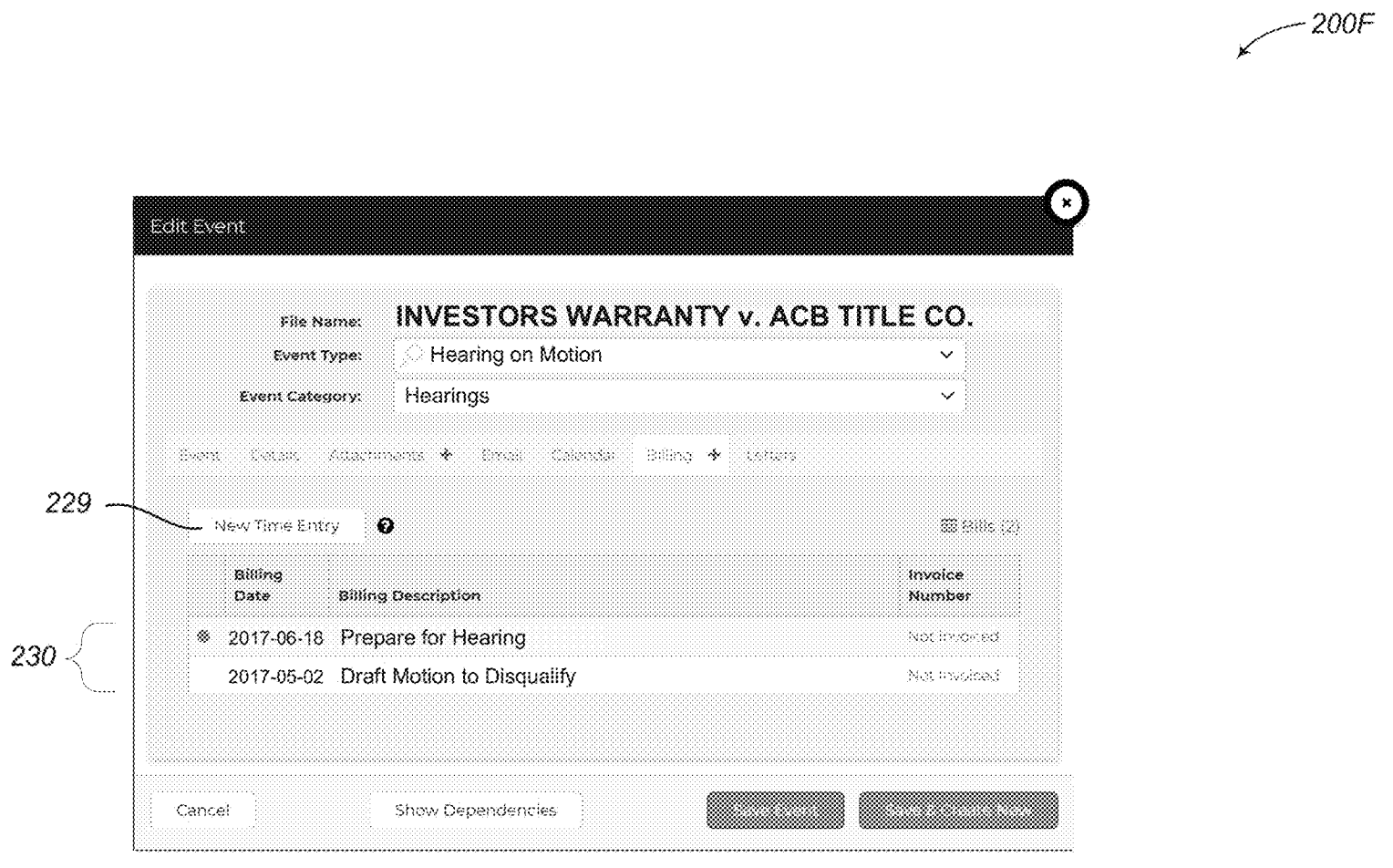

Interface 200F in FIG. 2F enables the user to enter billing information for the event. For example, the user can click button 229, which may open a window that enables the user to input a date, description, and time accrued for work done. A summary 230 of the billed time may be provided to the user.

The example interfaces shown in FIGS. 2A-2E are for illustrative purposes and may be different in look and the amount of information requested from or shown to the user.

FIGS. 3A-3F illustrate an enlarged, simplified example of a legal matter status bar in accordance with embodiments described herein.

Status bar 300A in FIG. 3A illustrates an initial status bar after a legal matter is opened. The status bar 300A includes a representation 304a-304h (collectively 304) for each phase in the legal matter. In some embodiments, one or more characteristics of the phase representations 304 may be modified depending on the status of one or more events associated with the phase. In this illustration, the representations 304 that are unfilled (representations 304b-304h) indicate that those corresponding phases have not yet started. A phase has not started when there are no events associated with that phase. Conversely, representations that are filled with solid black (representation 304a) indicate that a phase is complete. In some embodiments, a phase is complete when one event associated with that event is identified as being complete, such as by user input. In other embodiments, a phase is complete when each and every event associated with that phase is identified as being complete.

The status bar 300A also includes a marker 306. The marker 306 is associated with the phase of a most recently added event. In this example, the only phase with an event is the phase associated with the representation 304a. Therefore, marker 306 is associated with phase representation 304a. In this illustrated example, the marker 306 is a pin-like symbol that is abuts or connects to the applicable phase representation 304. Other symbols and placements of the marker 306 may be utilized. For example, the marker 306 may be a circle around the phase representation 304 or some other color or characteristic of the phase representation 304.

Status bar 300B in FIG. 3B illustrates an example where one or more events have been added to the pleadings phase, which is shown by the hatching of phase representation 304b. Because an event has been added to phase representation 304b, the marker 306 is moved to phase representation 304b.

As the legal matter progresses, additional events may be added to the other phase representations 304 and some may even be completed. An example of such progress is illustrated by Status bar 300C in FIG. 3C. In this illustrated example, the pleadings and discovery phases shown by representations 304b and 304c, respectively have been completed (illustrated by solid black fill), and the motions, hearings, and pre-trial phases shown by representations 304d, 304e, and 304g, respectively, have been started (illustrated by the hatched fill). Moreover, the most recently added event among all phases 304 was added to the pre-trial phase. Therefore, the marker 306 was moved to the pre-trial phase shown by representation 304g. The settlement and closed phases shown by representations 304f and 304h, respectively, have not yet started (illustrated as unfilled).

Because the marker 306 moves to the phase representation of the phase with the most recently added event, the marker 306 can be moved to any phase with at least one event. The representations of these events may be identified as being eligible to receive the marker. Status bar 300D in FIG. 3D illustrates an example, where the latest event was added to the motions phase shown by representation 304d. In this example, however, the pre-trial phase shown by representation 304g has not been completed, so it remains as started but not complete (illustrated by hatched fill).

Figure 3E:
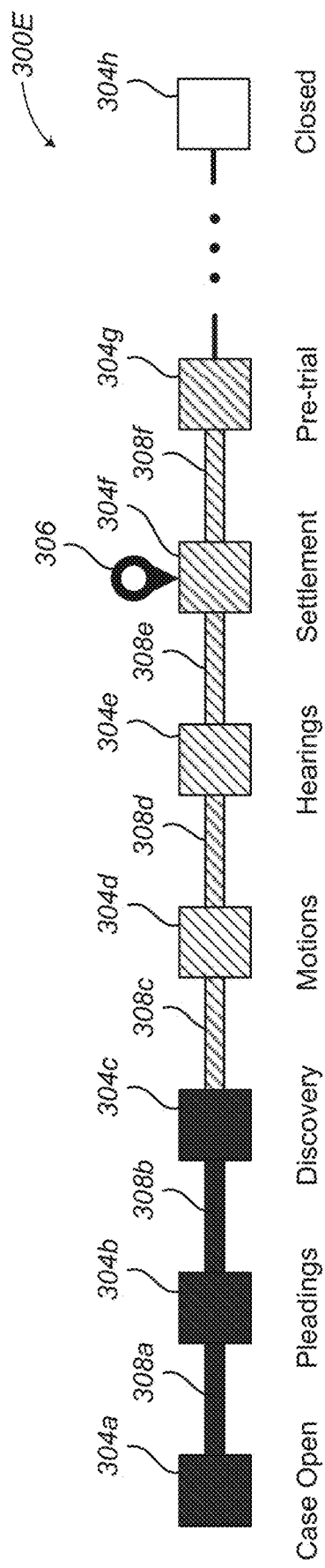

If an event is added to the settlement phase, then its phase representation 304f is changed from unfilled to hatched and the marker 306 is moved to the phase representation 304f, which is shown in by status bar 300E in FIG. 3E.

Figure 3F:
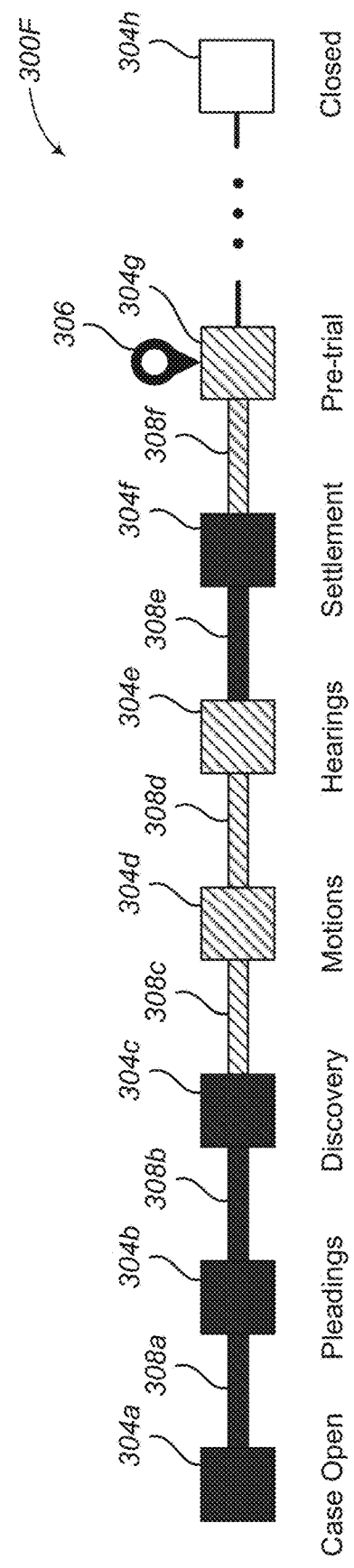

If the settlement event is completed (e.g., the settlement negotiations failed and were closed), then the phase representation 304f is changed from hatched to solid fill, which is shown by status bar 300F in FIG. 3F. In some embodiments, the marker 306 is moved to or stays on the phase representation 304 of the phase identified as complete. In other embodiments, the marker 306 is moved to a next chronological phase (e.g., the phase that includes event having a next event date), to the next most recently added event, or to a phase selected by the user.

Although FIGS. 3A-3F illustrate a new position of the marker 306 based on events being completed or added to a phase, embodiments are not so limited. For example, in some embodiments not illustrated, arrows may be utilized to indicate the movement of the marker 306. For example, between FIGS. 3E and 3F the marker 306 is moved from the settlement representation 304f to the pre-trial representation 304g. In some embodiments, an arrow may be overlaid or positioned on the status bar 300F to illustrate this movement of the marker 306. In various embodiments, a plurality of arrows may be utilized to show a preselected number of previous movements of the marker 306. In this way, a user can see additional details regarding the progress of the legal matter without having to look at a calendar, timeline, or list of events.

The example status bars shown in FIGS. 3A-3F are for illustrative purposes. In other embodiments, other phases than what are shown may be utilized. Moreover, other shapes of phase representations may be used, other colors or characteristics (size, shape, color, texture, fonts of labels associated with the phase representations, etc.) may be modified based on whether the phase is not started, started, or complete. Likewise, additional status bar features may be utilized to illustrate the progress of the legal matter.

For example, in some embodiments, the status bars 300A-300F may include connections 308a-308f (collectively 308) between adjacent phase representations 304a-304g. One or more characteristics (e.g., color, texture, shape, size, fonts of labels, etc.) of one or more connections may be changed based on updates to one or more phases. In various embodiments, the connection that is prior to (e.g., to the left of) a phase representation may be modified when the status of that phase has changed. In one embodiment, the connection that is after (e.g., to the right of) a phase representation may not be modified when the status of that phase has changed. In some embodiments, a connection prior to a phase representation may change so long as the immediately preceding phase has started or been completed, but the connection may not change if the immediately preceding phase has not started or been completed.

For example, in FIG. 3A, the connections 308a-308f are solid skinny lines because the phases associated with the phase representations 304b-304g have not started. But in FIG. 3B, the pleadings phase shown by representation 304b has started (illustrated by the hatched fill). In this illustrated example, the connection 308a between the case open phase representation 304a and the pleadings phase representation 304b has changed to be a hatched thick line to show progress from the case open phase to the pleadings phase.

As the legal matter progresses and additional phases are completed and started, the connections 308 along with the representations 304 may be updated, which is illustrated in FIG. 3C. In this illustrated example, the connection 308a between the case open phase representation 304a and the pleadings phase representation 304b has changed to be a solid filled thick line to show that the legal matter has completed the case open phase and the pleadings phase. Likewise, the connection 308b between the pleadings phase representation 304b and the discovery phase representation 304c has changed to be a solid filled thick line to show that the legal matter has also completed the discovery phase. Moreover, the connection 308c between the discovery phase representation 304c and the motions phase representation 304d and the connection 308d between the motions phase representation 304d and the hearings phase representation 304e have changed to be hatched thick lines to show that the motions and hearings phases have started, but are not yet complete. In this example, the pre-trial phase shown by representation 304g has also started. However, because the immediately preceding phase (settlement) has not started (illustrated by phase representation 304f being unfilled), connection 308f has not changed and is still a solid skinny line.

If an event is added to an already started phase, which results in moving the marker 306, the connection associated with that phase representation may not be modified—unless the phase status itself changes (e.g., changes to complete). An example of this scenario is shown in FIG. 3D with connections 308a and 308b staying as solid thick lines, connections 308c and 308d staying as hatched thick lines, and connections 308e and 308f staying as solid thin lines.

If a new phase is started and phases before and after the new phases have previously started, the connection between the new phase and the immediately preceding phase is modified and the connection between the new phase and the immediately following phase is also modified. An example of this scenario is shown in FIG. 3E. For example, in FIG. 3D the settlement phase has not yet started (illustrated by the representation 304f being unfilled) and its corresponding connections 308e and 308f are solid thin lines, even though the hearings and pre-trial phases have started (which are illustrated by representations 304e and 304g being hatch filled). But when the settlement phase is started and its phase representation 304f is changed to be hatch filled, the connections 208e and 308f are changed to be hatched thick lines, which is illustrated in FIG. 3E.

If the settlement phase becomes complete, with no other changes to the other phases, then the connection 308e preceding the settlement representation 304f is modified to be a solid thick line, while the connection 308f following the settlement representation 304f remains as a hatched thick line, which is shown in FIG. 3F.

Although FIGS. 3A-3F illustrate the connections as solid thin lines, hatched thick lines, or solid thick lines, embodiments are not so limited. For example, in some other embodiments not illustrated, colors or other characteristics of the connections may be modified to signal a change of status from one phase to another.

Figure 4:
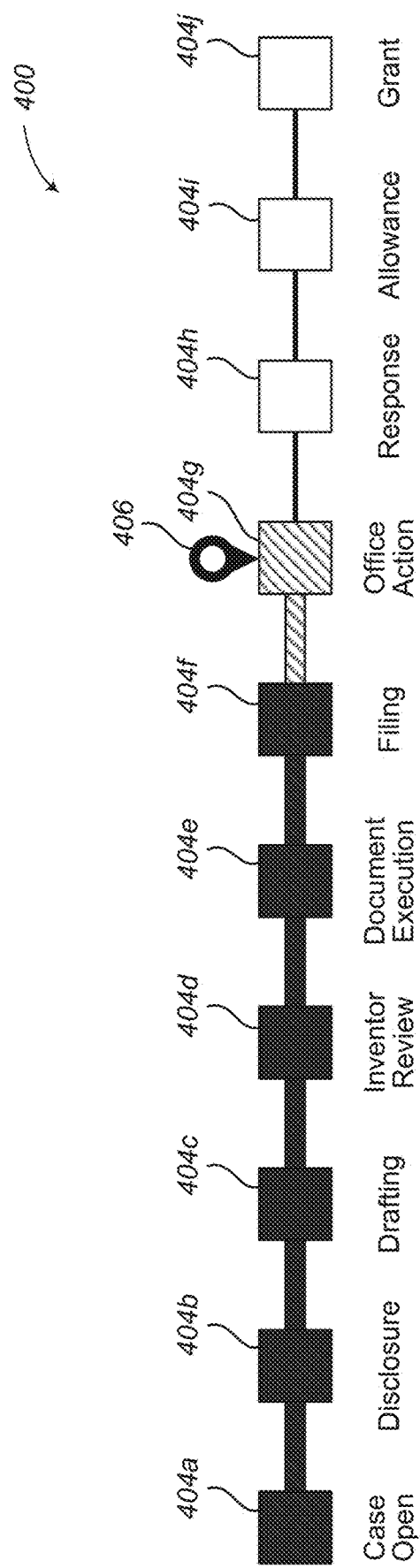
FIG. 4 illustrates an alternative enlarged, simplified example of a legal matter status bar in accordance with embodiments described herein.

FIG. 4 illustrates an alternative enlarged, simplified example of a legal matter status bar 400 in accordance with embodiments described herein. The status bars 300A-300F in FIGS. 3A-3F illustrate the phases of a typical litigation proceeding as the legal matter. Another example of a legal matter may be a patent application preparation and prosecution. In this example, the status bar 400 includes phase representations 404a-404j for the phases: matter open, disclosure, drafting, inventor review, document execution, filing, office action, response, allowance, grant. Although illustrated as a single status bar, the patent application process may be separated into two or more status bars. For example, one status bar may be for the preparation of the application (e.g., with phases disclosure, drafting, inventor review, document execution, and filing) and another status bar for the prosecution of the application (e.g., with phases filed, office action, response, appeal, allowance, grant).

In this illustrated example, the application has been drafted and filed (illustrated by the matter open, disclosure, drafting, inventor review, document execution, and filing phases 404a-404f being identified as complete using solid black fill) and an office action has been received from the patent office (illustrated by the office action phase 404g including an event shown by the hatched fill). Because an event (receipt of an office action) has been added to the office action phase 404g, the marker 406 is moved to phase 404g.

Other types of proceedings and legal matters may utilize the status bar and its functionality described herein, but with different phases, different numbers of phases, different phase representations, or different phase representation characteristic changes.

The operation of certain aspects will now be described with respect to FIGS. 5-7. Processes 500, 600, and 700 described in conjunction with FIGS. 5, 6, and 7, respectively, may be implemented by or executed on one or more computing devices, such as the legal-matter-phase-management server 102 in FIG. 1.

Figure 5:
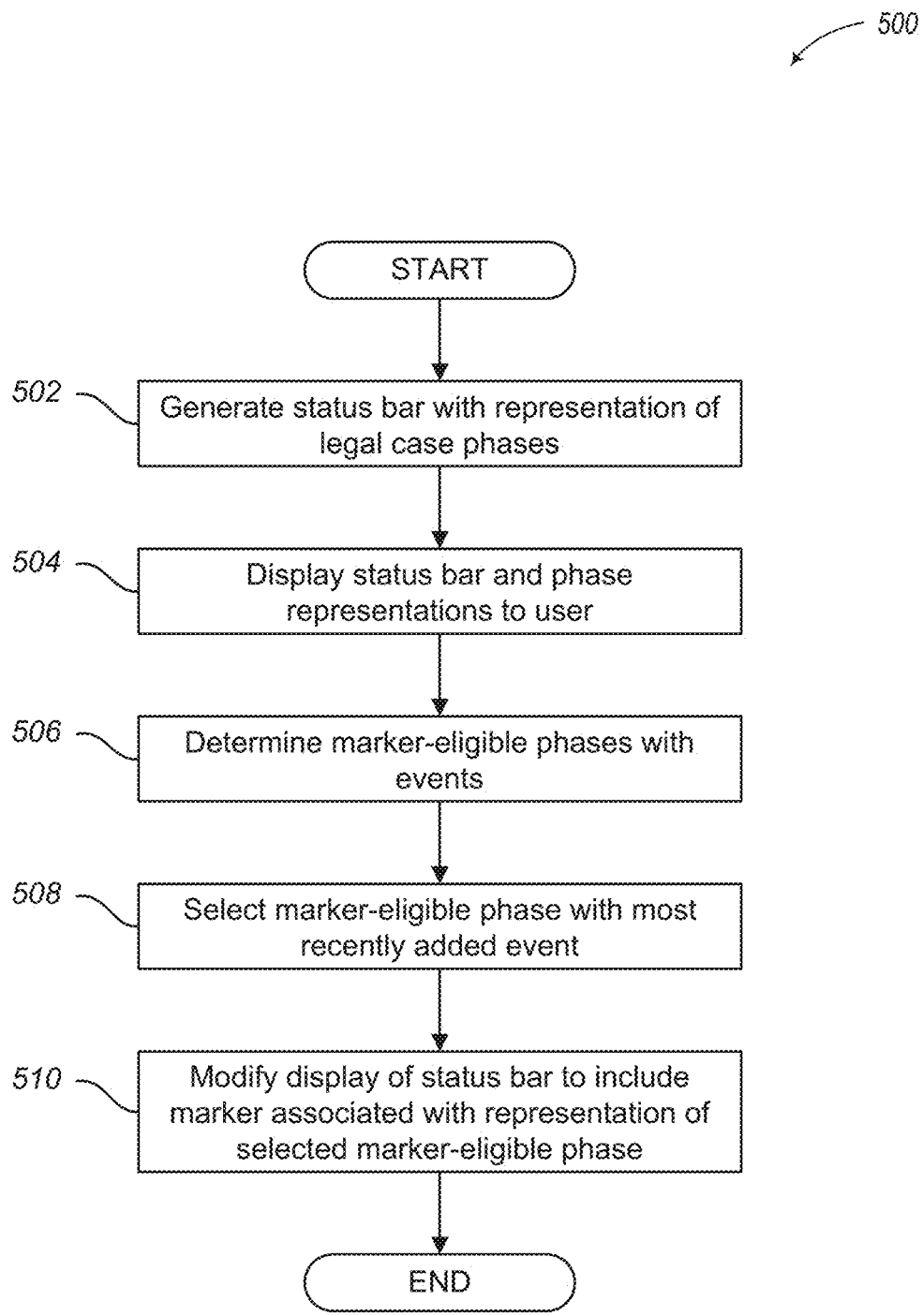
FIG. 5 is a logical flow diagram showing one embodiment of an overview process by a legal-matter-phase-management server for generating and presenting a graphical user interface with a legal matter status bar to users in accordance with embodiments described herein.

FIG. 5 is a logical flow diagram showing one embodiment of an overview process 500 by a legal-matter-phase-management server for generating and presenting a graphical user interface with a legal matter status bar to users in accordance with embodiments described herein.

Process 500 begins, after a start block, at block 502, where a status bar is generated with representations of a plurality of legal matter phases. The plurality of phases represent a chronological order of event groupings throughout the legal matter. One example of the phases may include at least three of: pleadings, discovery, motions, hearings, settlement, pre-trial, trial, and collections. Another example of the phases may include at least three of: disclosure, drafting, inventor review, document execution, filing, office action, response, allowance, and grant.

The status bar may be a horizontal line bar, such as illustrated in FIG. 2A or FIGS. 3A-3F. In other embodiments, the status bar may be a vertical line bar. The representation of each phase on the status bar may include a plurality of characteristics, such as color, shape, size, fonts of representation labels, etc. As described herein, one or more characteristics may change based on the particular status of that corresponding phase.

Process 500 proceeds to block 504, where the status bar and the phase representations are displayed to a user. In various embodiments, the status bar and the phase representations are displayed in a graphical user interface that enables the user to interact with the phase representations.

Process 500 continues at block 506, where marker-eligible phases are determined. In various embodiments, the phases that are marker eligible are those phases that have at least one event. In at least one embodiment, a phase is marker eligible if there is at least one non-complete event associated with the phase. In such an embodiment, if a phase only includes completed events, then it is not eligible for the marker.

Process 500 proceeds next to block 508, where a marker-eligible phase with a most recently added event is selected. The most recently added event may be an event that has the newest timestamp for when it was created by the user. In some other embodiments, the marker-eligible phase that is selected is the phase that includes an event with the next chronological event date. Therefore, if a first phase has an event due tomorrow and a second phase has an event due in two weeks, then the first phase may be selected.

Process 500 continues next at block 510, where the display of the status bar is modified to include a marker associated with the presentation of the selected marker-eligible phase. In some embodiments, the marker is attached to the phase representations, such as illustrated in FIGS. 2A and 3A-3F. In other embodiments, the marker may surround the phase representation or the marker may be a modified characteristic of the representation (e.g., enlarging the phase representation).

After block 510, process 500 terminates or otherwise returns to a calling process to perform other actions.

Figure 6:
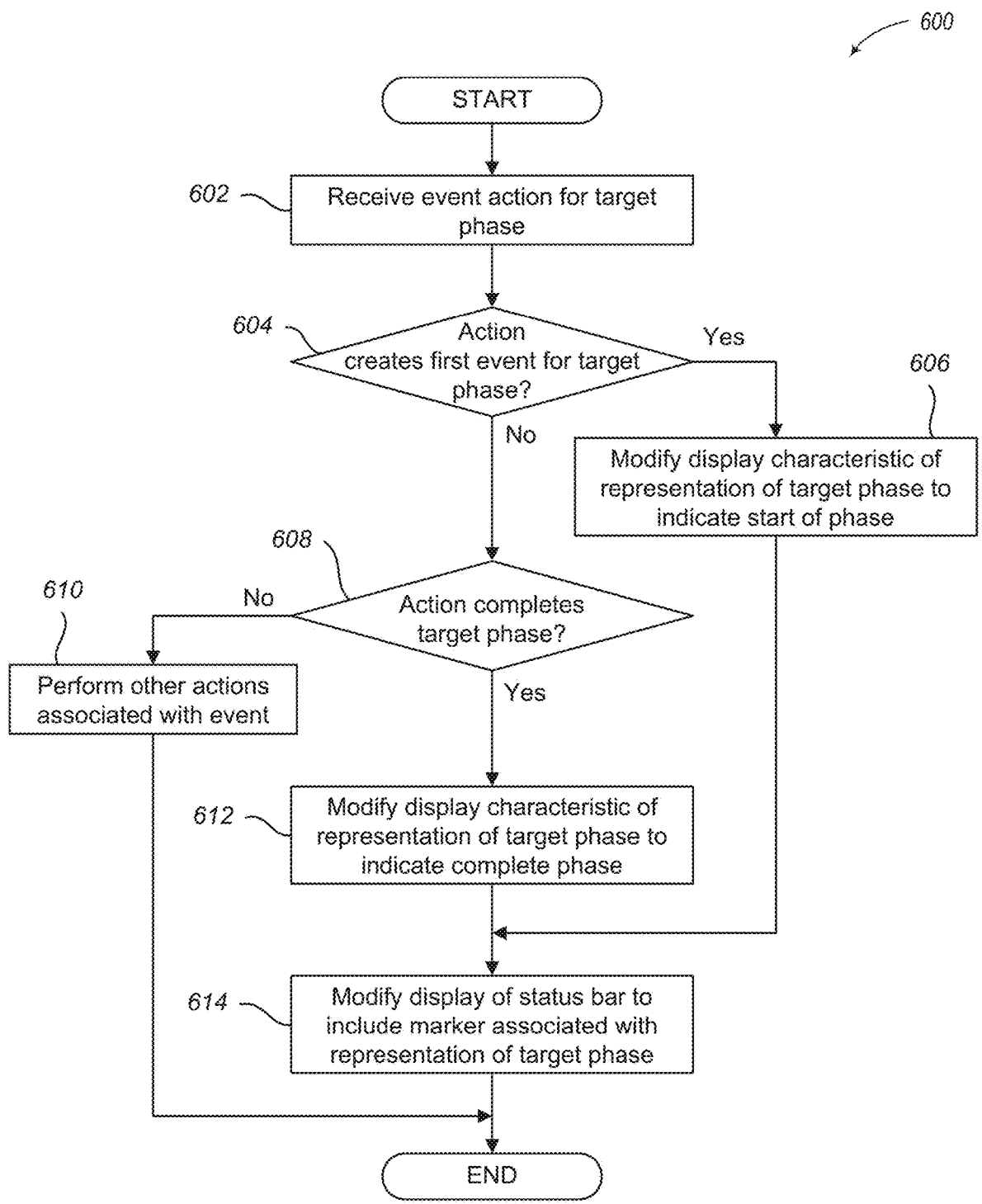
FIG. 6 is a logical flow diagram of one embodiment of a process by a legal-matter-phase-management server for performing event actions and modifying the legal matter status bar in the graphical user interface in accordance with embodiments described herein.

FIG. 6 is a logical flow diagram of one embodiment of a process 600 by a legal-matter-phase-management server for performing event actions and modifying the legal matter status bar in the graphical user interface in accordance with embodiments described herein. Process 600 begins, after a start block, at block 602, where an event action for a target phase is received. In various embodiments, the event action may be to add an event, change a detail or information about an existing event, mark an event as complete, etc.

Process 600 proceeds to decision block 604, where a determination is made whether the action is to create the first event for a target phase. If the event is the first event for a target phase, then process 600 flows to block 606; otherwise process 600 flows to decision block 608.

At block 606, one or more display characteristics of the representation for the target phase is modified to indicate that the target phase has started. In some embodiments, the color, size, or shape of the phase representation is modified. For example, the phase representation may be changed from black or white to yellow. In other embodiments, a font size, color, emphasis, or style of a label associated with the phase representation may be modified. For example, the label "Settlement" associated with the settlement phase representation may be italicized when the settlement phase beings. These examples of modifications to the display characteristics of the representation for the target phase are not limiting and other characteristics or modifications may be performed.

In some embodiments, one or more display characteristics of a connector associated with the representation of target phase may also be modified to indicate progress to the now started target phase. For example, the color of a connector between the representation of the target phase and the representation of a phase immediately preceding the representation of the target phase may be modified from black to yellow. If the phase immediately following the target phase has already been started, then the connector between the representation of the target phase and the representation of the immediately following phase may be modified from black to yellow. These examples of modifications to the display characteristics of the connectors associated with the target phase are not limiting and other characteristics or modifications may be performed.

After block 606, process 600 continues at block 614.

If, at decision block 604, the action does not create a first event for the target phase, process 600 flows from decision block 604 to decision block 608. At decision block 608, a determination is made whether the action completes the target phase. The user may change an event from active or pending to complete. In some embodiments, if the event is labeled as complete, then the phase is labeled as complete. In other embodiments, the phase is labeled as complete only when all events for that phase are labeled as complete. If the action completes the target phase, process 600 flows to block 612; otherwise, process 600 flows to block 610 to perform other actions associated with the event (e.g., change information of the event, update a note or date associated with the event, add an attachment, add a calendar notification, etc.).

At block 612, one or more display characteristics of the representation for the target phase is modified to indicate that the target phase is complete, which may be similar to what is described above in conjunction with block 606 but for a completed phase. In some embodiments, the color, size, or shape of the phase representation is modified. For example, the phase representation may be changed from yellow to green.

In some embodiments, one or more display characteristics of a connector associated with the representation of target phase may also be modified to indicate progress to the now completed target phase. For example, the color of a connector between the representation of the target phase and the representation of a phase immediately preceding the representation of the target phase may be modified from yellow to green. After block 612, process 600 continues at block 614.

At block 614, the display of the status bar is modified to move the marker to be associated with the representation of the target phase. In various embodiments, block 614 may employ embodiments of block 510 in FIG. 5 to modify the display of the status bar to include the marker.

After block 614 or block 610, process 500 terminates or otherwise returns to a calling process to perform other actions.

Figure 7:
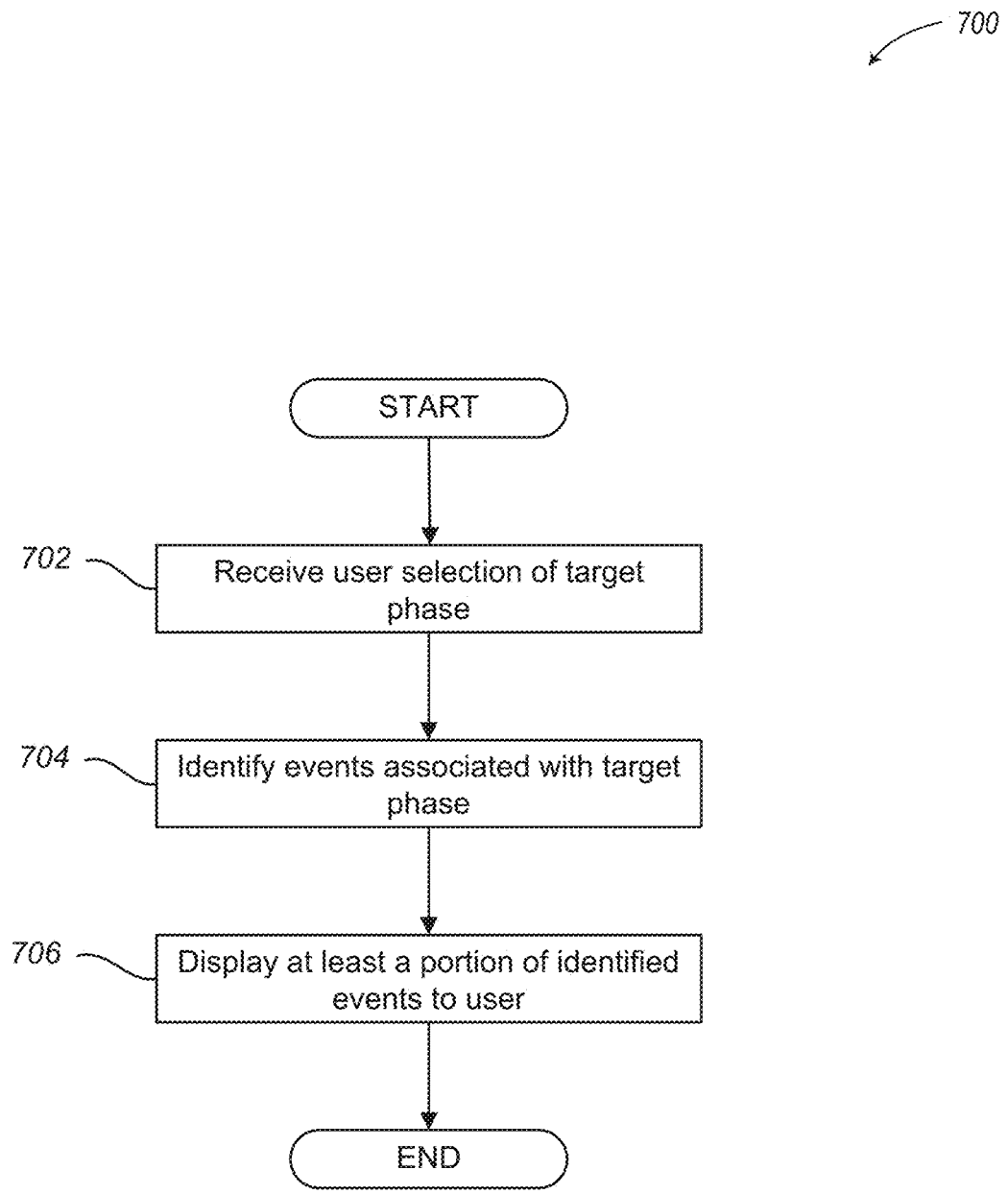
FIG. 7 is a logical flow diagram of one embodiment of a process by a legal-matter-phase-management server for presenting events of a phase on the legal matter status bar in the graphical user interface in accordance with embodiments described herein.

FIG. 7 is a logical flow diagram of one embodiment of a process 700 by a legal-matter-phase-management server for presenting events of a phase on the legal matter status bar in the graphical user interface in accordance with embodiments described herein. Process 700 begins, after a start block, at block 702, where a user selection of a target phase is received via the graphical user interface. In some embodiments, the user may select the target phase by clicking on the corresponding phase representation on the status bar or a label associated with the corresponding phase representation.

Process 700 proceeds to block 704, where the events associated with the target phase are identified. In various embodiments, an events database is searched for those events that are associated with the target phase.

Process 700 continues at block 706, where at least a portion of the identified events are displayed to the user. In some embodiments, a list of the identified events is presented to the user in the graphical user interface. The presentation of the identified events may be in chronological order based on the event start date, the date the event was created, or the event completion date. The order of the events may be selected by the user or predetermined by an administrator or developer.

Presentation of the identified events to the user in chronological order can enable the user to view the events associated with a particular phase (i.e., the target phase associated with the phase representation clicked on by the user) as those events have occurred or are scheduled to occur.

After block 706, process 700 terminates or otherwise returns to a calling process to perform other actions.

Figure 8:
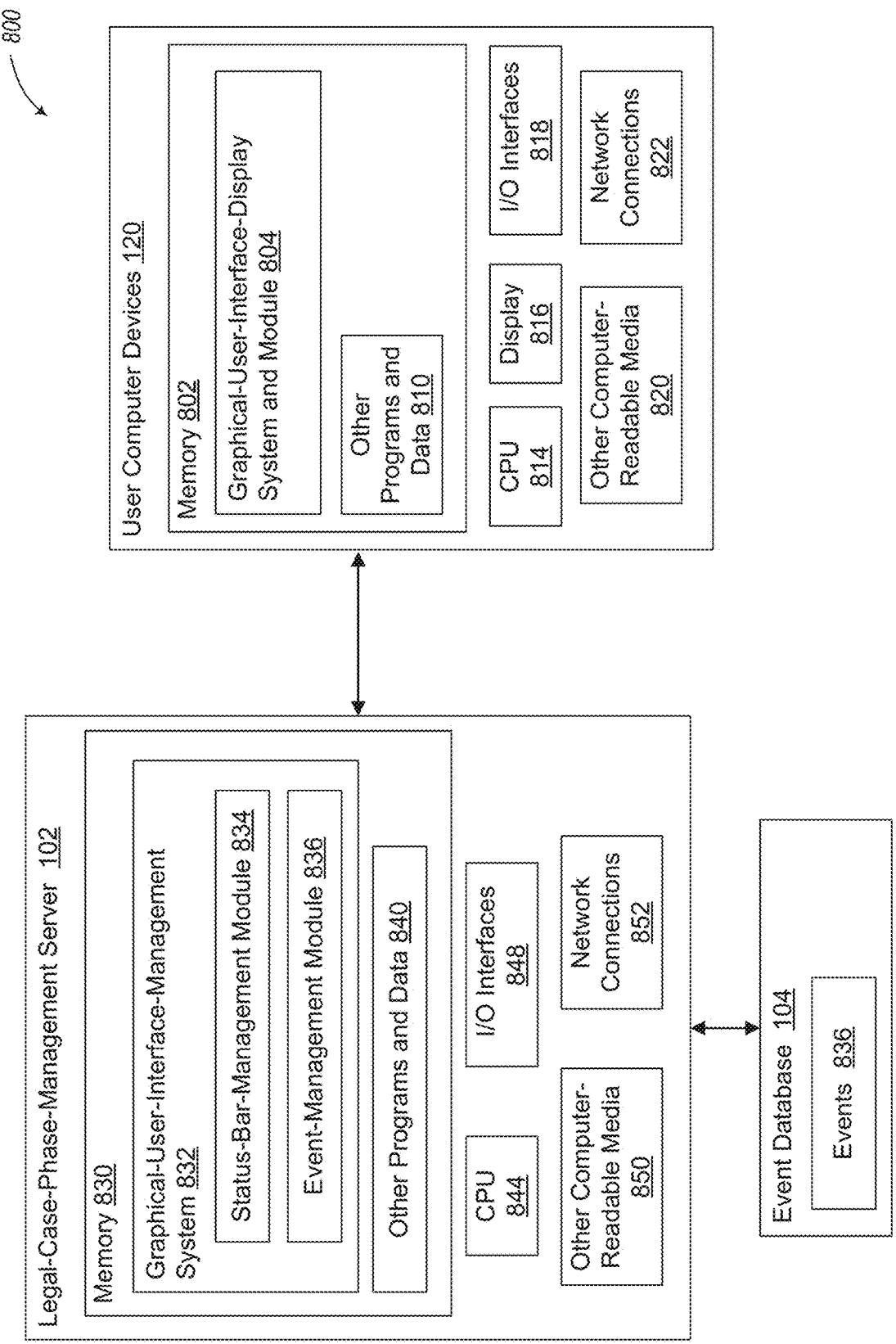
FIG. 8 is a system diagram that describes one implementation of computing systems for implementing embodiments described herein.

FIG. 8 shows a system diagram that describes one implementation of computing systems for implementing embodiments described herein. System 800 includes legal-matter-phase-management server 102, event database 104, and user computer devices 120.

One or more special-purpose computing systems may be used to implement legal-matter-phase-management server 102 to generate and present a status bar to a user of a user computer device 120 via a graphical user interface, as described herein. Accordingly, various embodiments described herein may be implemented in software, hardware, firmware, or in some combination thereof.

The legal-matter-phase-management server 102 includes memory 830, one or more central processing units (CPUs) 844, I/O interfaces 848, other computer-readable media 850, and network connections 852. The legal-matter-phase-management server 102 may include other computing components that are not shown for ease of illustration.

Memory 830 may include one or more various types of non-volatile and/or volatile storage technologies. Examples of memory 830 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 830 is utilized to store information, including computer-readable instructions that are utilized by CPU 844 to perform actions and embodiments described herein.

For example, memory 830 may have stored thereon graphical-user-interface-management system 832. Graphical-user-interface-management system 832 includes status-bar-management module 834 and event-management module 836 to employ embodiments described herein. For example, the status-bar-management module 834 generates a status bar for a legal matter. The status bar includes a representation of each of a plurality of phases of the legal matter and a marker associated with a phase that includes a most recent event. The event-management module 836 generates and displays events to the user. The status-bar-management module 834, the event-management module 836, or both, may interact with other computing devices, such as event database 104 to store and retrieve event information or a user computer device 120 to present the graphical user interface described herein to a user. Although illustrated separately, the functionality of the status-bar-management module 834 and the event-management module 836 may be performed by a single module. Memory 830 may also store other programs and data 840 to perform other actions associated with the operation of legal-matter-phase-management server 102.

Network connections 852 are configured to communicate with other computing devices, such as user computer devices 120 or other devices not illustrated in this figure. In various embodiments, the network connections 852 include transmitters and receivers (not illustrated) to send and receive data as described herein. I/O interfaces 848 may include a keyboard, audio interfaces, video interfaces, or the like. Other computer-readable media 850 may include other types of stationary or removable computer-readable media, such as removable flash drives, external hard drives, or the like.

User computer devices 120 receive information from the legal-matter-phase-management server 102 to present to a user the graphical user interface and legal matter status bar as described herein. Users can interact with the graphical user interface such that the user computer devices 120 provide information to the legal-matter-phase-management server 102 regarding such interactions. One or more special-purpose computing systems may be used to implement each user computer device 120. Accordingly, various embodiments described herein may be implemented in software, hardware, firmware, or in some combination thereof.

User computer devices 120 may include memory 802, one or more central processing units (CPUs) 814, display 816, I/O interfaces 818, other computer-readable media 820, and network connections 822. Memory 802 may include one or more various types of non-volatile and/or volatile storage technologies, similar to what is described above for memory 830.

Memory 802 is utilized to store information, including computer readable instructions that are utilized by CPU 814 to perform actions. In some embodiments, memory 802 may have stored thereon graphical-user-interface-display system and module 804, which presents the graphical user interface and legal matter status bar on display 816 based on information received from legal-matter-phase-management server 102. Memory 802 may also store other programs and data 810 to perform other actions associated with the operation of user computer device 120.

Display 816 is configured to provide content to a display device for presentation of the graphical user interface to a user. In some embodiments, display 816 includes the display device, such as a television, monitor, projector, or other display device. In other embodiments, display 816 is an interface that communicates with a display device.

I/O interfaces 818 may include a keyboard, audio interfaces, video interfaces, or the like, which may be configured to enable a user to interact with the graphical user interface described herein. Network connections 822 are configured to communicate with other computing devices, such as legal-matter-phase-management server 102 or other computing devices not illustrated in this figure. In various embodiments, the network connections 822 include transmitters and receivers (not illustrated) to send and receive data as described herein. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating a status bar to include a representation of each of a plurality of phases of a legal matter, the plurality of phases represent a chronological order of event groupings throughout the legal matter;
displaying the status bar and the representation of each of the plurality of phases in a graphical user interface,
determining one or more marker-eligible phases from the plurality of phases based on each of the one or more marker-eligible phases having at least one previously established event;
selecting a marked phase from the one or more marker-eligible phases based on the marked phase having a most recently added event among the one or more marker-eligible phases; and
modifying the display of the status bar in the graphical user interface to associate a marker with the representation of the marked phase.

2. The method of claim 1, further comprising:
receiving a new event for the legal matter having a date, title, and corresponding phase of the plurality of phases; and
modifying the display of the status bar in the graphical user interface to associate the marker with the representation of the corresponding phase for the new event.

3. The method of claim 1, further comprising:
receiving, via a user interaction with the representation of a target phase of the plurality of phases on the status bar in the graphical user interface, a selection of the target phase;
identifying each event associated with the target phase; and
displaying at least a portion of the identified events in chronological order in the graphical user interface.

4. The method of claim 1, further comprising:
receiving an indication that a target phase of the plurality of phases is complete; and
in response to receipt of the indication that the target phase is complete, modifying a display characteristic of the representation of the target phase on the status bar to indicate that the target phase is complete.

5. The method of claim 4, wherein modifying the display characteristic of the representation of the target phase includes at least one of:
changing color of the representation of the target phase;
changing a size of the representation of the target phase;
changing a shape of the representation of the target phase; and
changing a font of a label associated with the representation of the target phase.

6. The method of claim 4, wherein receiving the indication that the target phase is complete comprises:
receiving, via a user interaction with an event of the target phase in the graphical user interface, a selection that the event is complete.

7. The method of claim 1, further comprising:
receiving an indication that a target phase of the plurality of phases has changed; and
in response to receipt of the indication that the target phase has changed, modifying a display characteristic of a connector between the representation of the target phase and the representation of a preceding adjacent phase.

8. The method of claim 7, wherein modifying the display characteristic of the connector includes at least one of:
changing color of the connector;
changing a size of the connector;
changing a shape of the connector; and
changing a font of a label associated with the connector.

9. The method of claim 7, wherein the change in the target phase is that the target phase has started.

10. The method of claim 7, wherein the change in the target phase is that the target phase is complete.

11. The method of claim 1, further comprising:
receiving a new event for the legal matter having a corresponding phase of the plurality of phases;
determining that the new event is a first event for the corresponding phase; and
modifying a display characteristic of the representation of the corresponding phase on the status bar to indicate that the corresponding phase has started.

12. The method of claim 11, wherein modifying the display characteristic of the representation of the corresponding phase includes at least one of:
changing color of the representation of the corresponding phase;
changing a size of the representation of the corresponding phase;
changing a shape of the representation of the corresponding phase; and
changing a font of a label associated with the representation of the corresponding phase.

13. The method of claim 1, wherein the plurality of phases includes at least three of: matter open, pleadings, discovery, motions, hearings, settlement, pre-trial, trial, collections, and matter close.

14. The method of claim 1, wherein the plurality of phases includes at least three of: disclosure, drafting, inventor review, document execution, filing, office action, response, allowance, and grant.

15. A non-transitory computer-readable storage medium having stored thereon instructions that, when executed by a processor, cause the processor to perform actions, the actions comprising:
generating a status bar to include a representation of each of plurality of phases of a legal matter, the plurality of phases represent a chronological order of event groupings throughout the legal matter;
displaying the status bar and the representation of each of the plurality of phases in a graphical user interface,
determining one or more marker-eligible phases from the plurality of phases based on each of the one or more marker-eligible phases having at least one previously established event;
selecting a marked phase from the one or more marker-eligible phases based on the marked phase having a most recently added event among the one or more marker-eligible phases; and
modifying the display of the status bar in the graphical user interface to associate a marker with the representation of the marked phase.

16. The non-transitory computer-readable storage medium of claim 15, wherein execution of the instructions by the processor, cause the processor to perform further actions, the further actions comprising:
receiving a new event for the legal matter having a date, title, and corresponding phase of the plurality of phases; and
modifying the display of the status bar in the graphical user interface to associate the marker with the representation of the corresponding phase for the new event.

17. The non-transitory computer-readable storage medium of claim 15, wherein execution of the instructions by the processor, cause the processor to perform further actions, the further actions comprising:
receiving, via a user interaction with the representation of a target phase of the plurality of phases on the status bar in the graphical user interface, a selection of the target phase;
identifying each event associated with the target phase; and
displaying at least a portion of the identified events in the graphical user interface.

18. The non-transitory computer-readable storage medium of claim 15, wherein execution of the instructions by the processor, cause the processor to perform further actions, the further actions comprising:
receiving an indication that a target phase of the plurality of phases is complete; and
in response to receipt of the indication that the target phase is complete, modifying a display characteristic of the representation of the target phase on the status bar to indicate that the target phase is complete.

19. The non-transitory computer-readable storage medium of claim 15, wherein execution of the instructions by the processor, cause the processor to perform further actions, the further actions comprising:
receiving a new event for the legal matter having a corresponding phase of the plurality of phases;
determining that the new event is a first event for the corresponding phase; and
modifying a display characteristic of the representation of the corresponding phase on the status bar to indicate that the corresponding phase has started.

20. A computing device, comprising:
a non-transitory memory that stores computer instructions; and
a processor that executes the computer instructions to:
generate a status bar to include a representation of each of plurality of phases of a legal matter, the plurality of phases represent a chronological order of event groupings throughout the legal matter;
display the status bar and the representation of each of the plurality of phases in a graphical user interface,
determine one or more marker-eligible phases from the plurality of phases based on each of the one or more marker-eligible phases having at least one previously established event;
select a marked phase from the one or more marker-eligible phases based on the marked phase having a most recently added event among the one or more marker-eligible phases; and
modify the display of the status bar in the graphical user interface to associate a marker with the representation of the marked phase.

21. The computing device of claim 20, wherein the processor further executes the computer instructions to:
receive a new event for the legal matter having a date, title, and corresponding phase of the plurality of phases; and
modify the display of the status bar in the graphical user interface to associate the marker with the representation of the corresponding phase for the new event.

22. The computing device of claim 20, wherein the processor further executes the computer instructions to:
receive, via a user interaction with the representation of a target phase of the plurality of phases on the status bar in the graphical user interface, a selection of the target phase;
identify each event associated with the target phase; and
display at least a portion of the identified events in the graphical user interface.

23. The computing device of claim 20, wherein the processor further executes the computer instructions to:
- receive an indication that a target phase of the plurality of phases is complete; and
- in response to receipt of the indication that the target phase is complete, modify a display characteristic of the representation of the target phase on the status bar to indicate that the target phase is complete.

24. The computing device of claim 20, wherein the processor further executes the computer instructions to:
- receive a new event for the legal matter having a corresponding phase of the plurality of phases;
- determine that the new event is a first event for the corresponding phase; and
- modify a display characteristic of the representation of the corresponding phase on the status bar to indicate that the corresponding phase has started.

\* \* \* \* \*